(12) United States Patent
Saito (10) Patent No.: US 6,182,218 B1
(45) Date of Patent: *Jan. 30, 2001

(54) DIGITAL CONTENT MANAGEMENT SYSTEM USING ELECTRONIC WATERMARK

(75) Inventor: Makoto Saito, Tokyo (JP)

(73) Assignee: Mitsubishi Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/881,533

(22) Filed: Jun. 24, 1997

Related U.S. Application Data (63) Continuation-in-part of application No. 08/573,958, filed on Dec. 13, 1995, now Pat. No. 5,740,246.

(30) Foreign Application Priority Data

Dec. 13, 1994 (JP) .................................................. 6-309292

(51) Int. Cl.[7] ....................................................... H04L 9/00

(52) U.S. Cl. ........................... 713/176; 713/161; 380/279

(58) Field of Search .................................. 380/4, 21, 54, 380/202, 278, 279; 382/100, 232; 707/9, 10, 104; 705/1, 51, 55, 57, 58; 713/168, 176, 161

(56) References Cited

U.S. PATENT DOCUMENTS

| | | | |
|---|---|---|---|
| 5,689,587 | * 11/1997 | Bender | 380/54 X |
| 5,765,152 | * 6/1998 | Erickson | 707/9 |
| 5,765,176 | * 6/1998 | Bloomberg | 707/514 |
| 5,841,886 | * 11/1998 | Rhoads | 382/115 |
| 5,848,155 | * 12/1998 | Cox | 380/4 |

FOREIGN PATENT DOCUMENTS

| | | | |
|---|---|---|---|
| 0459046 | 12/1991 | (EP) | G06F/1/00 |
| 0704785 | 4/1996 | (EP) | G06F/1/00 |
| 0 719 045 | 6/1996 | (EP) . | |
| 0715241 | 6/1996 | (EP) | G06F/1/00 |
| WO 95/20291 | 7/1995 | (WO) . | |
| WO 96/27259 | 9/1996 | (WO) . | |

OTHER PUBLICATIONS

Komatsu N et al: "A Proposal On Digital Watermark In Document Image Communication and Its Application to Realizing a Signature" Electronics & Communications In Japan Part I—Communications, vol. 73, No. 5, Part I, May 1, 1990, pp. 22–33.

* cited by examiner

*Primary Examiner*—Pinchus M. Laufer
(74) *Attorney, Agent, or Firm*—Armstrong, Westerman, Hattori, McLeland, & Naughton (57) ABSTRACT

A system for managing a digital content, particularly a digital content to which a copyright is claimed, and a system for supplying a public-key which is used in the management of the digital content are provided. The digital content management program is embedded to an operating system of a user apparatus as a micro kernel, a watch program or a watch command which is linked to the digital content management program is transmitted to the user apparatus by using a network or data broadcasting, and thereby, the illegitimate usage of the digital content is watched. A visible watermark is added to the digital content when illegitimately utilized, to restrain later usage. Even in regular usage, the route of copying or transferring the digital content can also be ascertained by adding an invisible watermark. Further, a public-key is put in a public-key distribution screen to be distributed by the network or broadcasting. Image data to which information on owner of the public-key or on the user is added as an invisible electronic watermark, is entered to the public-key distribution screen, so that the authenticity of the public-key and the user is checked by the electronic watermark.

6 Claims, 6 Drawing Sheets

DIGITAL CONTENT MANAGEMENT SYSTEM USING ELECTRONIC WATERMARK

CROSS-REFERENCE TO RELATED APPLICATIONS

This is a continuation-in-part of prior U.S. patent application Ser. No. 08/573,958 filed on Dec. 13, 1995 now U.S. Pat. No. 5,740,246, which is commonly assigned to the assignee of the present invention.

BACKGROUND OF THE INVENTION

1. Field of the Invention

The present invention relates to a system for managing digital content, specifically for managing a copyright of digital content claiming the copyright and for securing secrecy of digital content.

2. Background Art

In the current information age, a public database network has been expanding as the number of connected computers keeps increasing. The various data stored in these computers could be shared through communication lines.

The information having been handled by the prior art database system is classical type coded information which can be processed by a computer and has a small amount of information or monochrome binary data like facsimile data at most. Therefore, the prior art database system has not been able to handle data with an extremely large amount of information such as a natural picture and a motion picture.

However, while the digital processing technique for various electric signals develops, development of the digital processing art has shown progress for a picture signal other than binary data having been handled only as an analog signal.

By digitizing the above picture signal, a picture signal such as a television signal can be handled by a computer. Therefore, a "multimedia system" for handling various data handled by a computer and picture data obtained by digitizing a picture signal at the same time is noticed as a future technique.

Because hitherto widely-spread analog content is deteriorated in quality whenever storing, copying, editing, or transferring it, copyright issues associated with the above operations have not been a large problem. However, because the digital content is not deteriorated in quality after repeatedly storing, copying, editing, or transferring it, the control of copyrights associated with the above operations is a large problem.

There is hitherto no properly effective method for handling a copyright for the digital content. Although the copyright has been handled by the copyright law or relevant contracts, it has not been assuredly protected. Even under the copyright law, it is only systematized that compensation money is required for a digital-type sound recorder or a digital-type picture recorder when unauthorized uses of digital sound or images occur.

Use of a database includes not only referring to the contents of the database but also normally effectively using the database by storing, copying, or editing obtained digital content. Moreover, it is possible to transfer edited digital content to another person via on-line by a communication line or via off-line by a proper recording medium. Furthermore, it is possible to transfer the edited digital content to the database to enter it as new digital content.

In an existing database system, only character data is handled. In a multimedia system, however, audio data and picture data which are originally analog content are digitized to a digital content and formed into a database in addition to the data such as characters which have been formed into a database so far.

Under the above situation, how to handle a copyright of digital content formed into a database is a large problem. However, there has not been adequate copyright management means for solving the problem so far, particularly copyright management means completed for secondary utilization of the digital content such as copying, editing, or transferring of the digital content.

Although digital content referred to as software with advertisement or as freeware is, generally, available free of fee, it is copyrighted and its use may be restricted by the copyright depending on the way of use.

In view of the above, the inventor of the present invention has made various proposals thus far in order to protect a copyright of the digital content. In GB 2269302 and U.S. Pat. No. 5,504,933, the inventor has proposed a system for executing copyright management by obtaining a permit key from a key management center through a public telephone line, and has also proposed an apparatus for that purpose in GB 2272822. Furthermore, in EP 677949 and in EP 704785, a system has been proposed for managing the copyright of the digital content In these systems and apparatus, those who wish to view encrypted programs send a request to view a program using a communication device to a management center via a communication line, and the management center transmits a permit key in response to the request for viewing, and charges and collects a fee.

Upon receipt of the permit key, those who wish to view the program send the permit key to a receiver either by an on-line or an off-line means and the receiver, which has received the permit key, decrypts the encrypted program according to the permit key.

The system described in EP 677949 uses a program and copyright information to manage a copyright in addition to a key for permitting usage in order to execute the management of a copyright in displaying (including process to sound), storing, copying, editing, and transferring of the digital content in a database system, including the real time transmission of digital picture content. The digital content management program for managing the copyright watches and manages to prevent from using the digital content outside the conditions of the user's request or permission.

Furthermore, EP 677949 discloses that the digital content is supplied from a database in an encrypted state, and is decrypted only when displayed and edited by the digital content management program, while the digital content is encrypted again when stored, copied or transferred. EP 677949 also describes that the digital content management program itself is encrypted and is decrypted by a permit key, and that the decrypted digital content management program performs decryption and encryption of the digital content, and when usage other than storing and displaying of the digital content is executed, the copyright information including information about the one who has executed is stored as a history, in addition to the original copyright information.

In U.S. patent application Ser. No. 08/549,270 and EP 715241 relating to the present application, there is proposed a decryption/re-encryption apparatus having configuration of a board, a PCMCIA card or an IC card for managing the copyright, and a system for depositing a crypt key. Also, a reference is made to apply the copyright management method to a video conference system and an electronic commerce system.

In EP 709760, a system has been proposed wherein the protection of an original digital content copyright and an edited digital content copyright in case of the edited digital content using a plurality of digital contents is carried out by confirming the validity of a usage request according to a digital signature on an edit program by combining a secret-key cryptosystem and a public-key cryptosystem.

In EP 719045, various forms have been proposed for applying the digital content management system to a database and a video-on-demand (VOD) systems or an electronic commerce.

In EP 746126, a system has been proposed, in which copyrights on an original digital content and a new digital content are protected by using a third crypt key and a copyright label in case of using and editing a plurality of digital contents.

As can be understood from the digital content management systems and the digital content management apparatus which have been proposed by the inventor of the present invention described above, the management of a digital content can be realized by performing encryption/decryption/re-encryption and restricting the form of the usage by the digital content management program. The cryptography technology and the usage restriction thereof can be realized by using a computer.

In a case where secret information is exchanged via a network, the information is encrypted for preventing from piracy.

Preventing from the information piracy when transmitted is described in U.S. Pat. Nos. 5,504,818 and 5,515,441, and using a plurality of crypt keys in such a case is described in U.S. Pat. Nos. 5,504,816, 5,353,351, 5,475,757 and 5,381,480. Performing re-encryption is described in U.S. Pat. No. 5,479,514.

In order to use the computer efficiently, an operating system (OS) is used which, supervises the overall operation of the computer. The conventional operating system (OS) used on a personal computer or the like is constituted of a kernel for handling basic services such as memory control, task control, interruption, and communication between processes and OS services for handling other services.

However, improvement in the functions of the OS which supervises the overall operation of computers is now being demanded where circumstances change on the computer side, such as improved capability of microprocessors, a decreased price of RAM (Random Access Memory) used as a main memory, as well as improvement in the performance capability of computers is required by users, as a consequence, the scale of an OS has become comparatively larger than before.

Since such an enlarged OS occupies a large space itself in the hard disk stored OS, the space for storing the application programs or data needed by the user is liable to be insufficient, with the result in which the usage convenience in the computer becomes unfavorable.

In order to cope with such a situation, in the latest OS, an environmental sub-system for performing emulation of other OS and graphics displaying, and a core sub-system such as a security sub-system are removed from the kernel, as a sub-system that is a part that depends on the user. The basic parts such as a HAL (Hardware Abstraction Layer) for absorbing differences in hardware, a scheduling function, an interruption function, and an I/O control function is a micro-kernel, and a system service API (Application Programming Interface) is interposed between the sub-system and the micro-kernel, thereby constituting the OS.

By doing so, extension of the OS by change or addition of functions will be improved, and portability of the OS can be facilitated corresponding to the applications. By a distributed arrangement for elements of the micro-kernel to a plurality of network computers, the distributed OS can also be realized without difficulty.

Computers are used in computer peripheral units, various control units, and communication devices in addition to the personal computers represented by the desktop type or notebook type computers. In such a case, as an OS unique for embedding, applicable to each of the devices, a Real-Time OS (RTOS) is adopted in which execution speed is emphasized, unlike a general-purpose personal computer OS, in which the man-machine interface is emphasized.

Naturally, the development cost for a respective OS unique to each device embedded will be high. There has recently been proposed, therefore, that a general-purpose OS for personal computers as an RTOS for embedding is used instead. By arranging a specified program for embedding in a sub-system combined with the micro-kernel, an RTOS for embedding can be obtained.

As the major functions of an OS, there is a task control, such as scheduling, interruption processing, and the like. With respect to the task control, there are two kinds of OS's; a single-task type, in which only one task is executed at the same time, and a multi-task type, in which a plurality of task processes are executed at the same time. The multi-task type is further classified into two kinds; one multi-task type, in which changing of tasks depends on the task to be executed, and the other multi-task type, in which the changing does not depend on the task to be executed.

In the aforementioned types, the single-task type assigns one process to a MPU (MicroProcessor Unit) and the MPU is not released until the process comes to an end, and a non-preemptive multi-task type performs time-division for the MPU, and the MPU can be assigned to a plurality of processes. As long as the process which is being executed does not give control back to the OS, other processes are not executed. And a preemptive multi-task type interrupts the process which is being executed during a certain time interval and thereby forcibly move the control to another process. Consequently, real time multi-task can be available only in the case of the preemptive type.

The task control in a computer is performed according to processes being units having system resources such as a memory and a file. Process control is performed according to a thread, being a unit in which CPU time is assigned, in which the process is minutely divided. Incidentally, in this case, the system resources are shared in all the threads in the same process. More than one threads, therefore, may exist which share the system resources in one process.

Each task which is processed by the multi-task type has a priority spectrum, which is generally divided into 32 classes. In such a case, a normal task without interruption is classified into dynamic classes which are divided into 0 to 15 classes, while a task performing interruption is classified into real-time classes divided into 16 to 31 classes.

Interruption processing is carried out using interruption enabling time (generally, 10 milliseconds) referred to as a time slice, as one unit. A normal interruption is carried out during a time slice of 10 milliseconds. In such a situation, a time slice has recently been proposed wherein the interruption enabling time is set to 100 microseconds. When such a real time slice is used, an interruption can be carried out with greater priority than the conventional 10 milliseconds interruption.

The encryption technique is the means to exclude illegitimate use of the data content, but perfect operation is not guaranteed. Thus, the possibility of illegitimate use of the data content cannot be completely excluded.

On the other hand, electronic watermark technique cannot exclude the possibility of illegitimate use, but if illegitimate use is found, it is possible to check the illegitimate use by verifying the content of electronic watermark, and there are a number of methods in this technique. These methods are described in Nikkei Electronics, No. 683, 1997-2-24, pp. 99–124, "Digital watermark' to help stop to use illegal proprietary digital works in the multimedia age." Also, description is given on this technique by Walter Bender et al., "Introducing data-hiding technology to support digital watermark for protecting copyrights", IBM System Journal, vol. 35, Nos. 3 & 4, International Business Machines Corporation. The electronic watermark technique is also described in EP 649074.

SUMMARY OF THE INVENTION

The present invention provides a system for managing a digital content, and more particularly a system for managing the digital content to which a copyright is claimed and a system for supplying a public-key used for managing the digital content.

In a digital content management system which is proposed in the present invention, illegitimate usage of the digital content claiming a copyright is watched by using a network or data broadcasting. A digital content management program is embedded as a micro kernel to an operating system of a user apparatus, so that a usage of the digital content claiming the copyright is managed by the digital content management program. The user apparatus is under the management of the digital content management program, which is linked to a usage watch program, and the usage watch program performs a process with higher interruption priority than the digital content management program. The usage watch program watches the illegitimate usage of the digital content claiming the copyright, and when the digital content is illegitimately utilized, a warning or a stop for the usage is given, or visible electronic watermark is added to the digital content.

Further, invisible electronic watermark may be added in place of the visible electronic watermark to keep track of the usage status also when the digital content is regularly utilized.

Furthermore, the present invention provides a system for distributing a public-key by means of a network or broadcasting. The public-key is put in a public-key distribution screen to be distributed. On the public-key distribution screen, image data is entered, wherein information on the owner of the public-key is added as an invisible electronic watermark. When the user presents the public-key distribution screen to a public-key management center, the public-key management center checks the validity of the public-key owner by the invisible electronic watermark.

In a case where the public-key is distributed by means of a network, the information on the public-key owner or the information on the user who requests the public-key is added as the invisible electronic watermark so that the validity of the public-key or the validity of the user can be checked by detecting the added invisible electronic watermark. In such a case, checking can be facilitated when an electronic fingerprint of the user's public-key is used as the information on the user.

DETAILED DESCRIPTION OF THE INVENTION

The present invention is a copyright management system for digital content claiming the copyright and for securing secrecy of digital content. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

The description of the preferred embodiments according to the present invention is given below referring to the accompanied drawings.

In the protection of a digital content copyright, the greatest issue is how to prevent illegitimate usage of the digital content on the user side apparatus. For this purpose, decryption/re-encryption and restriction on usage are carried out by a digital content management program in a Method for Controlling Database Copyrights as described in EP 677949.

However, since decryption/re-encryption of the digital content for which its copyright is to be protected is performed using an apparatus on the user side, it is virtually impossible to expect that processing of the decryption/re-encryption and the management of a crypt key which is used for the purpose will be complete. There is a possibility that the digital content will be illegitimately stored, copied, transferred and edited by invalidating the digital content management program.

In order to restrict such illegitimate usage, it is required that the digital content management program for decryption/re-encryption of the digital content, and for managing the crypt key cannot be altered by the user. For this purpose, the digital content management program is hardwarized, which is firmware, is the most secure method.

For example, a dedicated scramble decoder is currently used for descrambling scrambled broadcast programs in analog television broadcast, and by using a similar configuration, a dedicated digital content management apparatus, so that decryption/re-encryption of the digital content and management of the crypt key are available only by the dedicated digital content management apparatus.

Although such a configuration is reliable, the system structure is lacking in flexibility. When the apparatus on the user side is changed, or the digital content management program is changed, it is very hard for the user to respond to such changes.

In order to correspond with flexibility to a case where the apparatus on the user side changes, or a case where the digital content management program is changed, it is desirable for the digital content management program to be software. However, there is a possibility that the digital content management program is altered as long as the digital content management program is an application program.

For the digital content management program being software, the digital content management program is required to be embedded in a kernel that is a fixed area of the operating system and cannot be altered by the user. However, it is not practical for the digital content management program to be embedded in the fixed area of a kernel, where the digital content management system and the cryptosystem are differentiated between the databases.

As described above, some RTOS can perform interruption in real time slice time which is one or two figures faster than the time slice of the system in another OS that includes kernel area. By using this technology, if the digital content claims its copyright to be protected, it is watched on its usage status, without disturbing the overall operation, according to the technology. If the digital content is illegitimately used, the illegitimate usage is found and it is given a warning and is forced to stop.

Next, a method for reinforcing a digital content management program by using an RTOS is described.

Since illegitimate usage of the digital content is carried out by unauthorized editing, unauthorized storing, unauthorized copying or unauthorized transferring of the decrypted digital content, whether the illegitimate usage has been carried out or not, can be detected by whether editing, storing, copying or transferring of the decrypted digital content is performed or not. As a consequence, the process for watching the illegitimate usage interrupts a process which is being executed by the digital content management program, in a certain time interval, while interrupting by a preemptive type multi-task which forcibly carries out watching of the process.

The multi-task time slice normally used is 10 milliseconds, and the decryption/re-encryption process is carried out in this time unit. On the other hand, the fastest real time slice is 100 microseconds, which is $1/100$ of the normal time unit. Consequently, the watching task, which has high interruption priority, can watch the digital content as to whether the decrypted digital content is being edited, stored, copied or transferred, so that the usage status of the digital content for which the copyright is claimed can be watched without affecting regular usage by the user, and when the illegitimate usage is found, a warning can be given and usage thereof can be forcibly stopped.

The digital content management program with such a watching function is embedded into a sub-system area which is operated in the user mode in place of the kernel of the OS, and the watching process is regarded as a process with a high priority. By this configuration, the usage status of the digital content by decryption/re-encryption and also the illegitimate usage other than the permitted usage can be watched at the same time, and such watching can be executed smoothly.

Figure 1:
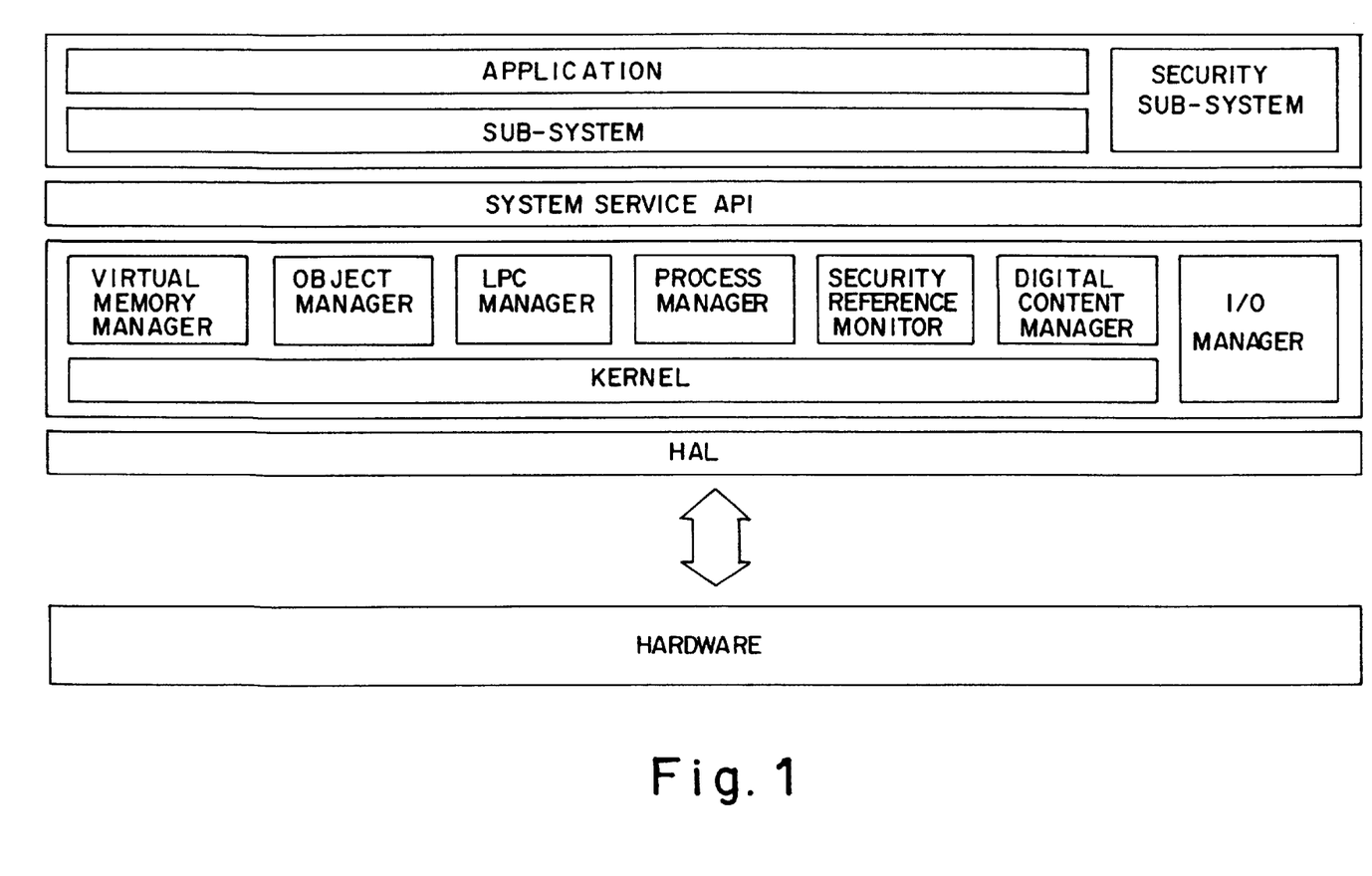
FIG. 1 is a structural concept view showing an operating system having a digital content management function used in the present invention.

FIG. 1 shows a structure of an operating system into which the digital content management program is embedded. This operating system comprises an executive which works in a kernel mode which cannot be operated by the user, and a sub-system which works in a user mode which can be operated by the user. The executive and the sub-system are interfaced with a system service API (Application Programming Interface), and a HAL (Hardware Abstraction Layer) is interposed between the hardware and the kernel.

The sub-system comprises an environmental sub-system for performing emulation of other operating system and graphics displaying, and a core sub-system such as a security sub-system, and an application program.

In the executive, a virtual memory manager which is the micro-kernel, an object manager, an LPC (Local Procedure Call) function, a process manager, a security reference monitor, and an I/O manager which manages input and output between kernel and disk, and network, which is the most basic elements, and further the digital content management program which manages the digital content claiming the copyright, namely, a digital content manager are embedded. To manage storing, copying or transferring the digital content, which is an important part of the digital content management, is carried out by the digital content manager managing the I/O manager.

Figure 2:
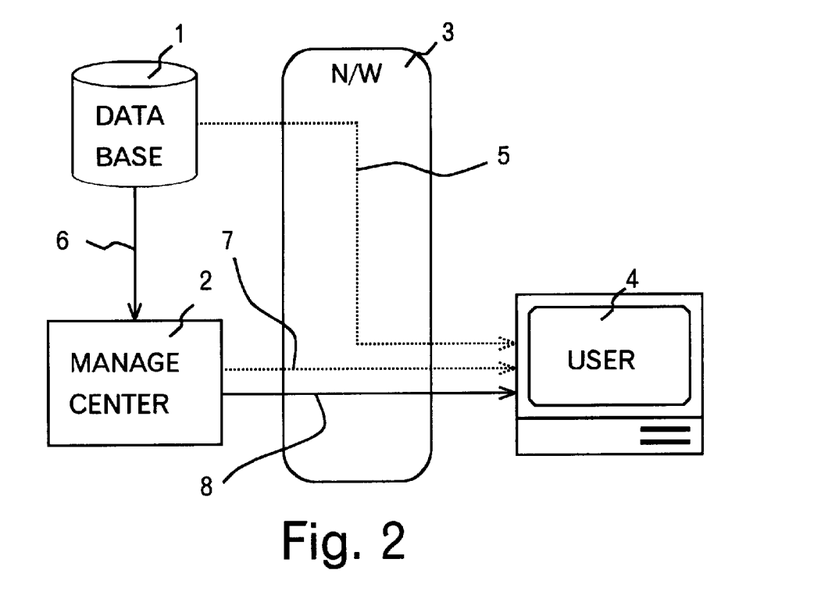
FIG. 2 is a structural view showing a digital content management system for watching an illegitimate usage of the digital content according to the present invention.

What is shown in FIG. 2 is an embodiment of the digital content management system to which the present invention is applied. In this digital content management system, the usage status of the digital content by the user is watched via the network.

In FIG. 2, reference numeral 1 represents a database; 2 a digital content management center; and 4 a user. The user 4 and, the database 1 and the digital content management center 2 are connected by a network 3 which is a communication line or a bi-directional CATV line.

The digital content is stored in the database 1, and the encrypted digital content is transferred to the user 4 via a path 5 shown by a broken line. The database 1 transfers a crypt key for decryption and a crypt key for re-encryption, which are the crypt keys for decryption/re-encryption of the digital content, to the digital content management center 2 via a path 6. The digital content management center 2 encrypts the crypt key for decryption and the crypt key for re-encryption which have been transferred, and distributes them to the user 4 via a path 7 shown by a broken line. The digital content management center 2 further transmits a watch program to the user 4 via a path 8 shown by a solid line.

The usage permission details are managed by the digital content management program, which is embedded to an apparatus used by the user 4. However, it is impossible to completely deny the possibility that the digital content could be utilized by an ill-willed user outside the range which is managed by the digital content management program. The digital content management program manages the input and output of the user apparatus 4. The input and output from the memory, namely storing, copying, and transferring the digital content by the user, are all managed by the digital content management program. When the digital content is stored, copied, or transferred, it is re-encrypted. Even if an ill-will user makes performing the above-mentioned management impossible, the fact that the digital content is stored, copied or transferred is detected by the watch program which interrupts the digital content management program.

Figure 3A:
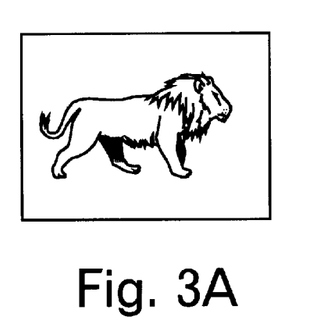
FIGS. 3A and 3B illustrate a management state by the digital content management system of the present invention.
Figure 3B:
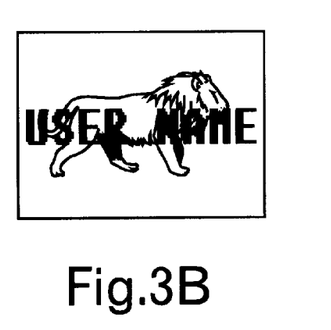

The watch program performs the watching work by linking with the digital content management program embedded in the user apparatus 4, and by interrupting a process of the digital content management program; and watches whether or not the user utilizes the digital content beyond the usage permission. If the unauthorized storing, copying or transferring usage is detected, the watch program, instead of displaying a warning described in EP 677949, stops to perform decryption, forcibly re-encrypts the digital content with a crypt key which is not known to the user or adds the visible electronic watermark to the original digital content of FIG. 3A as shown in FIG. 3B, or adds the invisible electronic watermark to digital content as shown in FIG. 4B.

Here, the usage permission refers to simple usage, storing into an inside storing device, copying to an outside medium, or transferring to other users via a network, of the digital content.

Incidentally, for a visible electronic watermark to be added, it is preferable to use something that can be easily identified such as a user name.

When the digital content management program embedded to the user apparatus is working, the watch program cooperates. In other words, it is a configuration that the digital content management program does not work unless the watch program works cooperatively with the digital content management program.

For the aforementioned purpose, what the watch program does is to set a condition for working the digital content management program, via a network. Otherwise, when the digital content management program works, the watch program is automatically operated via the network.

In a case where the digital content which have been transferred to the user via the network is used, the watch program is entered into the digital content to be transferred and thus, the watch program is also transferred together with the digital content when transferred.

Further, the watch program may be integrated with the digital content management program so that a watch command is sent which allows the digital content management program to perform the watch work, thereby allowing the digital content management program to watch the digital content.

In the digital content management system, which is executed via the network, when digital content having a large amount of information such as picture data is handled, an ISDN (Integrated System for Digital Network) line is used in many cases as a communication line.

As the ISDN line, there are generally used two data channels having a data transmission speed of 64 Kbps (kilo bits per second) referred to as B channels, and a control channel having a data transmission speed of 16 Kbps referred to as D channel. Naturally, the digital content is transmitted through one or two data channels, while the D channel is not used in many cases.

Thus, if the D channel is used for the interruption watching by the watch program, it would be possible to watch the usage status by remote control without affecting the usage of the digital content at all.

Furthermore, in case of using a public line, interruption watching can be efficiently carried out by using ADSL (Asymmetric Digital Subscriber Line) technology, which is capable of realizing a maximum transmission speed of 56 Kbps for downloading.

Figure 4A:
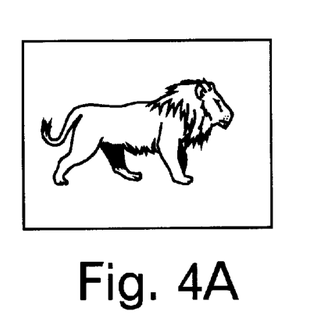
FIGS. 4A, 4B and 4C illustrate another management state by the digital content management system of the present invention.
Figure 4B:
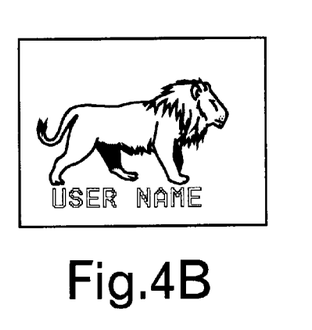
Figure 4C:
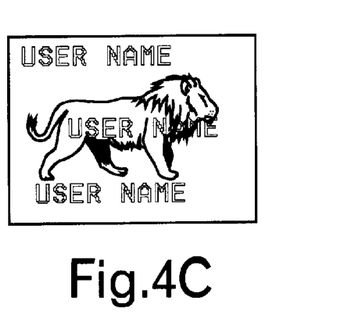

FIGS. 4A–4C show an example in which an electronic watermark is added even when regular storing, copying or transferring of the digital content, within the usage permission details. The electronic watermark in this case is an invisible electronic watermark which is detected as shown in FIG. 4B by the electronic watermark detection means. If the electronic watermark detection means is not used, the digital content can be seen at a glance to be the same as the original digital content, as shown in FIG. 4A.

Incidentally, for an invisible electronic watermark to be added, similar to the case of the visible electronic watermark, it is appropriate which can be easily identified, such as a user name or the like.

By doing so, the route of storing, copying, and transferring can be ascertained in the case where the digital content is illegitimately utilized, even if the digital content has been normally utilized in the beginning. Further, even in case of normal usage, the repeats of storing, copying and transferring makes the invisible electronic watermark increase, as shown in FIG. 4C, with the result that deteriorates the quality of the digital content. As a consequence, endlessly storing, copying and transferring may be impossible and managing the digital content can be facilitated.

For the digital content which is not deteriorated in quality after repeatedly storing, copying and transferring, also therefore, deteriorating the digital content in the above manner allows to restrain the illegitimate usage without actively managing copyrights, similarly a case where analog content is deteriorated by repeatedly storing, copying and transferring.

Adding visible electronic watermark or noise may be used for restraining the illegitimate usage, as means for deteriorating the quality of the digital content other than the invisible electronic watermark.

"Re-encryption," which is an important element for the digital content management, is a process being a considerably heavy burden to the user apparatus. As a consequence, simply adding the electronic watermark is effective for preventing illegitimate usage of the digital content as a simplified manner.

In a case where the digital content is used in pay basis, as described in EP 677959, if a user obtains a use permit key in advance, charging a fee can be easily carried out. In a case where a digital content management center collects metering data which is a usage result later by polling and charges the fee, the metering data is placed under the management of the user until the polling is carried out. As a consequence, the metering data may be falsified by an ill-will user and then, there is a possibility that normal charging is not carried out.

In the digital content management system of the present embodiment, the user apparatus is always connected to the digital content management center while the user is utilizing the digital content, and the usage status is watched by the watch program. If the metering data is stored at the digital content management center, in the watching work, there is no need for polling, and therefore, falsification of the metering data by the user can be prevented.

Furthermore, even in a case where the digital content is used free of charge, the usage status by the user can be easily grasped.

Figure 5:
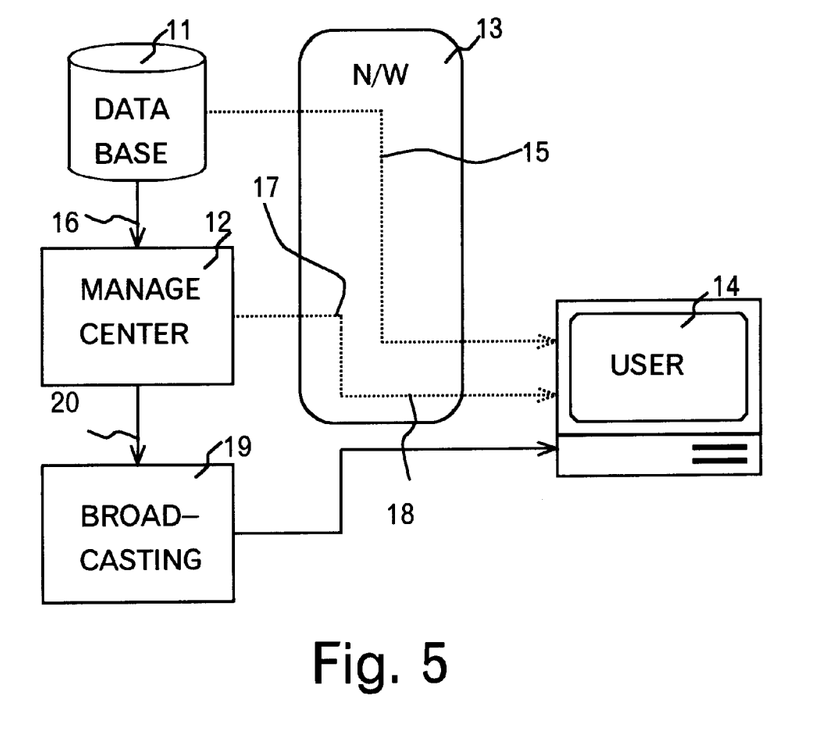
FIG. 5 is a structural view showing another digital content management system for watching an illegitimate usage of the digital content according to the present invention.

FIG. 5 shows a structural view of another embodiment of the digital content management system to which the present invention is applied. In this digital content management system, the usage status of the digital content is watched by broadcasting.

In FIG. 5, reference numeral 11 represents a database, 12 a digital content management center, and 14 a user. Between the user 4 and, the database 11 and the digital content management center 12 are connected with the network 13 such as a public line or a bidirectional CATV line.

In the database 11, the digital content is stored. The encrypted digital content is transferred to the user 14 via a path 15 shown as a broken line. The digital content management center 12 encrypts a crypt key for decryption and a crypt key for re-encryption which are crypt keys for performing decryption/re-encryption of the digital content, and distributes them to the user 14 via a path 17 shown by the broken line. The digital management center 12 further transfers a watch command to a broadcasting station 19, and the broadcasting station 19 transmits the transferred watch command to the user 14 through a path 18 shown by a solid line.

A broadcasting wave is most generally used for the path 18, but a CATV cable as a cable broadcasting may also be used. In a case where broadcasting via Internet is carried out, it is possible to use the network as well.

The watch command interrupts a process executed by the digital content management program which is embedded to an apparatus used by the user 14, and makes the digital content management program watch whether or not the user utilizes the digital content beyond the usage permission. And then if the unauthorized storing, copying or transferring usage is found, the digital content management program stops the decryption process, or adds the visible electronic watermark of FIG. 3B or adds the invisible electronic watermark of FIG. 4B to the digital content.

When the digital content management program embedded to the user apparatus is working, the watch command is carrying out interruption. In other words, it is constituted that the digital content management program does not work unless the broadcast wave in which the watch command is broadcast is received.

For the aforementioned purpose, the fact that the watch command is received via the broadcast wave is set as a condition for making work the digital content management program. Otherwise, when the digital content management program is worked, the watch command is automatically received via broadcast wave.

In a case where the digital content which have been transferred to the user by data broadcast or the like is used, the watch command is entered into the digital content to be transferred and thus, the watch command is also transferred together with the digital content.

The digital content management program manages the input and output in the user apparatus 14. The input and output from the memory by the user, namely, storing, copying and transferring the digital content, are all managed by the digital content management program. When the digital content is stored, copied or transferred, it is re-encrypted. Even in a case where the management cannot be carried out due to an ill-will user, the fact that the digital content is stored, copied or transferred is detected by the watch program which interrupts the digital content management program.

If the watch program detects illegitimate usage, it adds the visible electronic watermark shown in FIG. 3B instead of displaying a warning described in EP 677949. It may also be possible to add invisible electronic watermark which is detected only by the electronic watermark detection means, as shown in FIGS. 4B and 4C when normal usage of storing, copying or transferring within the usage permission.

The aforementioned watching work through broadcasting or a network is carried out not by the user according to the user's own will, but by the digital content management program automatically when the digital content claiming the copyright is utilized.

In order to ensure the above operation further, it is constituted that decryption/re-encryption by the digital content management program are not carried out unless watching work through broadcasting or a network is carried out.

Furthermore, when the digital content claiming the copyright is utilized, the broadcast wave for broadcasting the watch program is received or the user apparatus is automatically connected to the management center which transmits the watch program via a network.

Next, an embodiment for distributing a public-key is described.

The size of a crypt key used in the secret-key cryptosystem, which is also referred to as a common key system, is about 100 bits at most whereas a larger size the crypt key used in the public-key cryptosystem can exceed 1000 bits. The public-key cryptosystem is highly secured but rather complex in operation thus, it is used for encryption of data of comparatively small amount when sending of a secret-key, digital signature, authentication and the like. Encrypting the digital content is performed by using the secret-key.

In the public-key cryptosystem, a public-key and a private-key are used in combination with each other. The private-key is under the management of the owner of the key, so that other persons cannot know the private-key, whereas the public-key is required to be known by other persons for usage purposes.

As a consequence, the public-key is distributed to the public by various means. When a user can receive the public-key directly from the owner, the user is less likely to receive a false (incorrect) public-key.

A digital content management system, a so-called key distribution network is here proposed, which allows to check easily whether the distributed public-key is correct or not, where the public-key is distributed by indirect distribution means such as through broadcast or a network.

Figure 6:
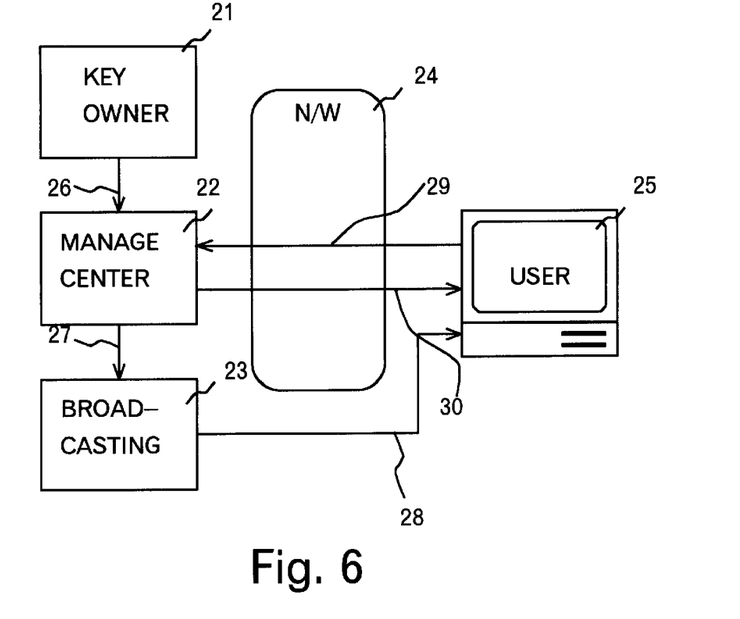
FIG. 6 is a structural view showing a digital content management system for distributing a public-key used for the management of the digital content according to the present invention.

FIG. 6 shows an embodiment of the digital content management system of the present invention in which the public-key is distributed by broadcasting.

since the public-key is generally distributed widely, the digital content management system according to this embodiment can be used as a simplified authentication method to replace the current adopted PEM method, which is an authentication method to authenticate the public-keys in the electronic commerce.

In FIG. 6, reference numeral 21 represents an owner of a public-key, 22 a public-key management center, 23 a broadcast station, 24 a network, and 25 a user.

The broadcast station 23 is a broadcast station of television of terrestrial analog, satellite analog, CATV analog, terrestrial digital, satellite digital, CATV digital and the like, or of sound. Data broadcast is carried out by appropriate means such as VBI (Vertical Blanking Interval), sound multiplex, data insertion. A station for Internet broadcast may be used as this broadcast station.

The network 24 is a public line or a bi-directional CATV line. The public-key management center 22 and the user 25 are connected with the network 24. The broadcast station 23 and the user 25 are connected with an appropriate information transmission medium.

In the digital content management system as above arrangement, the public-key owner 21 transfers some data for identification of the public-key owner which certifies identity of the owner of the public-key and the public-key, to the public-key management center 22 via the path 26.

As the data for identification of the public-key owner, information such as the name of the public-key owner is directly used in this case. However, an electronic fingerprint which the information is reduced to 16-byte data with MD5 hash algorithm, may be used.

Figure 7A:
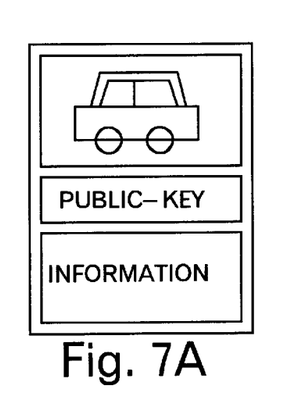
FIGS. 7A, 7B, 7C and 7D illustrate a method for distributing the public-key by the digital content management system of FIG. 6.

The public-key management center prepares a public-key distribution screen as shown in FIG. 7A and the public-key is put in a predetermined position. This screen is prepared by using HTML (Hyper Text Markup Language) or XML (extensible Markup Language) so that the public-key can be easily separated and used. Image data is entered to a part thereof.

Figure 7B:
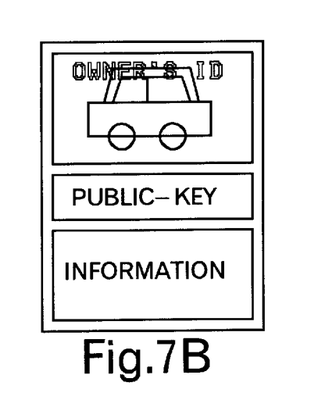

In this image data, the data for identification (owner's ID) of the public-key owner 21 is added as the invisible electronic watermark. The algorithm for this invisible watermark and the added position are known only to the public-key management center. Then, the public-key management center can know the description of the electronic watermark as shown in FIG. 7B, however, a normal screen as shown in FIG. 7A is provided when viewed and cannot be known the description of the electronic watermark for other people.

If the image screen is used for an advertisement, the cost required for the distribution of the public-key can be earned through the advertisement fees. Additional information such as urgent or notice information can be further inserted on another part thereof. Furthermore, a time stamp may be added to carry out management such as setting of a valid period.

A photograph as the image data is most appropriate content to be used to be added to the electronic watermark therein. Audio data can also be used as the content.

The broadcast station 23 broadcasts the public-key distribution screen, which has been prepared in the aforementioned manner, via the broadcast path 28.

Although the broadcast public-key distribution screen is received by the user 25, the electronic watermark added to the image screen of the public-key distribution screen is invisible, and thus, the user 25 cannot know the description of the electronic watermark.

The user 25 separates the public-key from the broadcast public-key distribution screen to be used for various electronic commerce. However, when the authenticity of the public-key is doubted, the public-key distribution screen is transferred to the public-key management center 22 via the path 29 by the network 24.

The public-key management center 22 detects the invisible electronic watermark added to the image screen of the transferred public-key distribution screen and notifies the identification information of the public-key owner which is detected as shown in FIG. 7B to the user 25 through via the path 30 by the network 24.

By so doing, when a different person pretends to be the owner of the public-key, the pretension can be detected. In this case, when an electronic fingerprint is used as identification information for the owner of the public-key, the detection can be remarkably facilitated.

Figure 7C:
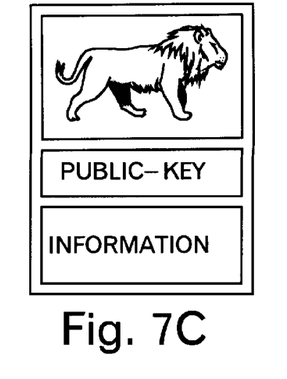
Figure 7D:
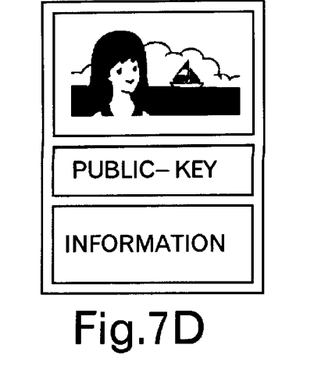

For the image screen, a favorite screen shown in FIG. 7C or a photograph of the public-key owner himself or herself can be used as shown in FIG. 7D. In such cases, fees for advertisement are collected and can be used for the broadcast costs.

Incidentally, the invisible electronic watermark added in this embodiment can be detected only by the public-key management center. If watermark detection algorithm is placed in the digital content management program shown in FIG. 1 or watermark detection program is embedded to the 'executive' as one independent micro kernel, it is possible for the user to detect only. In such a case, an electronic fingerprint may be used as the identification information for the public-key owner, so that the user can detect the electronic fingerprint of the public-key owner.

Another embodiment of the present invention is described below, in which a public-key is distributed in accordance with the request by a user, referring to FIG. 8.

The digital content management system for distributing the public-key by broadcasting, which is described referring to FIG. 6, is an effective system in a case where the public-key is distributed to an indefinite large number of users used in electronic commerce or the like. On the contrary, in case of using for the personal mail transmission, the public-key is distributed to a definite small number of users, and thus, it is not required for the public-key to be distributed by broadcasting. In the digital content management system shown in FIG. 8, since the public-key is distributed individually via the network, the system can be used as a simplified authentication method in place of PGP (Pretty Good Privacy), which is adopted in the public-key authentication method used for such as e-mail.

Figure 8:
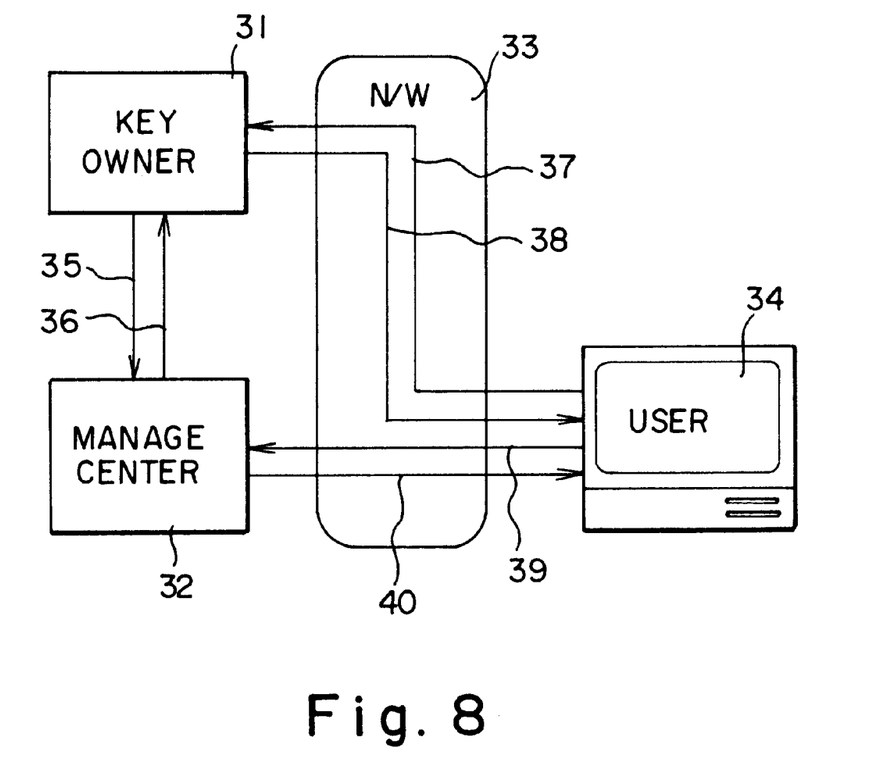
FIG. 8 is a structural view showing another digital content management system for distributing a public-key used for the management of the digital content according to the present invention.

In FIG. 8, reference numeral 31 represents a public-key owner, 32 a public-key management center, 33 a network, and 34 a user.

The network 33 is a public line or a bi-directional CATV line. Between the user 34, and the public-key owner 31 and the public-key management center 32 are connected with the network 33. Between the public-key owner 31 and the public-key management center 32 are connected by an appropriate information transmission means.

In the digital content management system as above arrangement, the public-key owner 31 transfers some data for identification of the public-key owner which certifies identity of the owner of the public-key and the public-key, to the public-key management center 32 via the path 35.

The public-key management center 32 puts the public-key in a predetermined position of the public-key distribution screen as shown in FIG. 7A and further, adds the data for identification of the public-key owner in the image screen of the public-key distribution screen as an invisible electronic watermark to be sent back to the public-key owner 31 via the path 36.

Since the data for identification of the public-key owner and the public-key distribution screen used in the digital content management system of this embodiment are the same as in the case of the digital content management system shown in FIG. 6, further explanation will be omitted.

The user 34 who wishes to obtain the public-key of the public-key owner 31 requests distribution of the public-key to the public-key owner 31 through the path 37 via the network 33. In response to the request, the public-key owner 31 transfers the public-key distribution screen to the user 34 through the path 38 via the network 33.

The user 34 separates the public-key from the public-key distribution screen which has been transferred, encrypts the e-mail by using the separated public-key and transmit it to the public-key owner 31. The public-key owner 31 decrypts the encrypted e-mail by own private-key.

When the user 34 doubts about the authenticity of the transferred public-key, the public-key distribution screen, which has been transferred, is transferred to the public-key management center 32 by the path 39. The public-key management center 32 detects the invisible electronic watermark added to the image screen of the transferred public-key distribution screen, and notifies the result to the user 34 by the path 40.

By so doing, when a different person pretends to be the public-key owner 31, the pretense can be detected.

In this embodiment, the public-key distribution screen is distributed directly from the public-key owner 31 to the user 34, but it is also possible to constitute that the public-key distribution screen is managed by the public-key management center 32 to be distributed.

Further embodiment of the present invention is described below referring to FIGS. 9 and 10A–10D, wherein the public-key is distributed in accordance with a request by a user. A public-key for the electronic commerce is used here.

In the embodiments shown in FIG. 6 and shown in FIG. 8, the public-key owner is checked by using an electronic watermark, but in the embodiment shown in FIGS. 9 and 10A–10D, a user of the public-key is checked.

Figure 9:
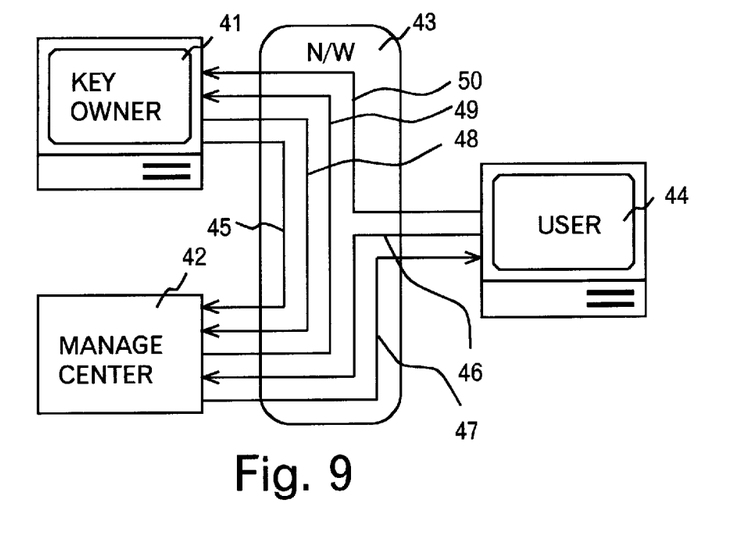
FIG. 9 is a structural view showing yet another digital content management system for distributing a public-key used for the management of the digital content according to the present invention.

In the digital content management system shown in FIG. 9, reference numeral 41 represents a public-key owner, 42 a public-key management center, 43 a network, and 44 a user.

The network 43 is a public line or a bi-directional CATV line. Between the public-key owner 41 and the user 44, between the public-key owner 41 and the public-key management center 42, and between the user 44 and the public-key management center 42 are connected with the network 43 respectively.

In the digital content management system as above arrangement, the public-key owner 41, first, transfers the owned public-key to the public-key management center 42 by the path 45, and the public-key management center 42 keeps the transferred public-key.

The user 44, who wishes to place an order or the like in the electronic commerce to the public-key owner 41, transfers some data as identification data for user which certifies the identity of the user 44 to the public-key management center 42 through the path 46 via the network 43.

Figure 10A:
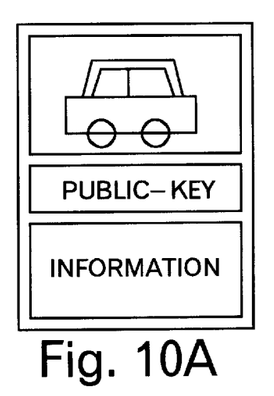
FIGS. 10A, 10B, 10C and 10D illustrate a method for distributing the public-key by the digital content management system of FIG. 9.
Figure 10B:
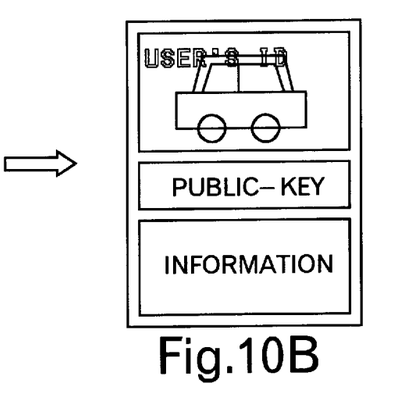

The public-key management center 42 puts the public-key in a predetermined position of the public-key distribution screen as shown in FIG. 10A and further, adds the identification data for user 44, as shown in FIG. 10B, in the image screen of the public-key distribution screen as an invisible electronic watermark to be transferred to the user 44 through the path 47 via the network 43.

As the identification data for user used here, it is possible to directly use information such as a user name, and also possible to use an electronic fingerprint which the information is reduced to 16-byte data with MD5 hash algorithm.

The public-key distribution screen is prepared by using HTML or XML to easily separate the put public-key, and an image data is entered to a part thereof. In this image data, identification data (user's ID) of the user 44 is added as an invisible electronic watermark. The algorithm for the invisible electronic watermark and the added position are known only to the public-key management center. The public-key management center can know the description of the electronic watermark when detected as shown in FIG. 10B, however, a normal screen as shown in FIG. 10A is provided when viewed and cannot be known the description of the electronic watermark for other people.

If the image screen is used for an advertisement, the cost required for the distribution of the public-key can be earned through the advertisement fees. Additional information such as urgent or notice information can be further inserted on another part thereof. Furthermore, a time stamp may be added to carry out management such as setting of a valid period.

It is most appropriate to use a photograph as the image data. When the sound data can be used, it is also possible to add the electronic watermark to the sound data.

The user 44 separates the public-key from the transferred public-key distribution screen, encrypts an order form by using the separated public-key, and transmits it to the public-key owner 41 together with the transferred public-key distribution screen.

The public-key owner 41 decrypts the encrypted order form by using own private-key and executes order acceptance.

When the public-key owner 41 doubts about the authenticity of the person who places the order, the transferred public-key distribution screen is transferred to the public-key management center 42 through the path 48 via the network 43.

The public-key management center 42 detects the invisible electronic watermark which is added to the image screen of the transferred public-key distribution screen, and notifies the result to the public-key owner 41 through the path 49.

By so doing, when a different person pretends to be the user 44, the pretension can be detected.

Figure 10C:
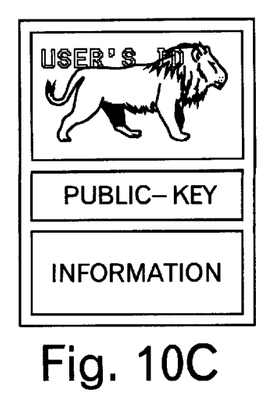
Figure 10D:
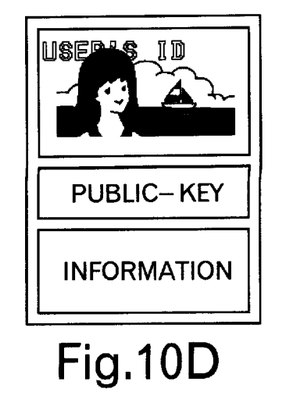

For the image screen, a favorite screen shown in FIG. 10C or a photograph of the public-key owner himself (herself) as shown in FIG. 10D may be used. In such cases, fees for advertisement are collected and can be used for distribution costs.

It is understood that particular embodiments described herein are illustrative and the present invention is not limited to these particular embodiments. It will be apparent to those skilled in the art that changes can be made in the various details described herein without departing from the scope of the invention. The present invention is defined by the claims and their full scope of equivalents.

I claim:

1. A method for digital content management in which a public-key is supplied from a public-key management center to a user, said method comprising the steps of:

putting said public-key in a public-key distribution screen, attaching an image to said public-key distribution screen;

adding information regarding a public-key owner as an invisible electronic watermark to said image;

distributing said public-key distribution screen by broadcast;

separating said public-key from said public-key distribution screen by said user;

presenting said public-key distribution screen by said user to said public-key management center; and checking said public-key owner by said public-key management center using said invisible electronic watermark.

2. The method of digital content management according to claim 1, wherein an electronic fingerprint of said public-key owner is used as said information of said public-key owner.

3. A method for digital content management in which a public-key is supplied from a public-key management center to a user, said method comprising the steps of:

requesting the distribution of said public-key from said public-key management center by said user;

putting said public-key by said public-key management center in a public-key distribution screen to be distributed to said user;

attaching an image to said public-key distribution screen;

adding information regarding said public-key owner as an invisible electronic watermark to said image;

separating said public-key from said public-key distribution screen by said user;

presenting said public-key distribution screen by said user to said public-key management center; and checking said public-key owner by said public-key management center using said invisible electronic watermark.

4. The method of digital content management according to claim 3, wherein an electronic fingerprint of said public-key owner is used as said information of said public-key owner.

5. A method for digital content management in which a public-key is supplied from a public-key management center to a user, said method comprising the steps of:

presenting information of said user and requesting the distribution of said public-key from said public-key management center by said user;

putting said public-key by said public-management center into a public-key distribution screen to be distributed to said user;

attaching an image to said public-key distribution screen;

adding information regarding said user as an invisible electronic watermark to said image;

separating said public-key from said public-key distribution screen by said user, and transferring said public-key distribution screen to a public-key owner together with digital content encrypted by using said public-key;

presenting said public-key distribution screen by said public-key owner to said public-key management center; and checking said user by said public-key management center using said invisible electronic watermark.

6. The method of digital content management according to claim 5, wherein an electronic fingerprint of said user is used as said information of said user.

* * * * *